No. 809,602.  
PATENTED JAN. 9, 1906.  
E. E. BARAKAT.  
PORTABLE SCALE.  
APPLICATION FILED SEPT. 13, 1905.

Witnesses,  
Inventor,  
Elias E. Barakat.  
by Howard L. Coombs, Atty.

UNITED STATES PATENT OFFICE.

ELIAS E. BARAKAT, OF WASHINGTON, DISTRICT OF COLUMBIA.

PORTABLE SCALE.

No. 809,602.  Specification of Letters Patent.  Patented Jan. 9, 1906.

Application filed September 13, 1905. Serial No. 278,272.

*To all whom it may concern:*

Be it known that I, ELIAS E. BARAKAT, a subject of the Sultan of Turkey, residing at Washington, District of Columbia, have invented certain new and useful Improvements in Portable Scales, of which the following is a clear and complete description.

The object of my invention is to provide a convenient and inexpensive portable scale, which while extremely simple in construction will nevertheless be of considerable capacity and enable very light articles to be weighed with accuracy, as well as bodies of some weight.

Figure 1:
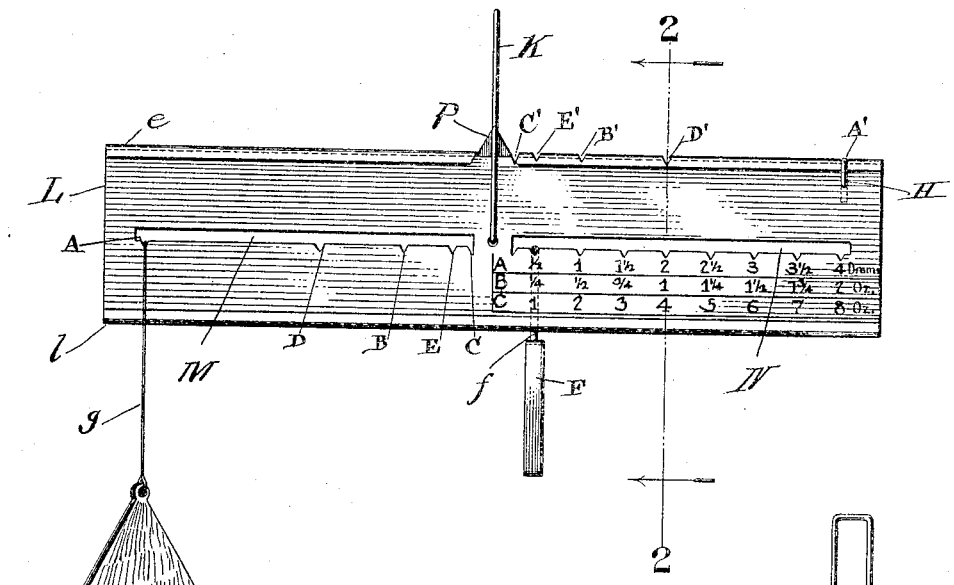
Figure 2:
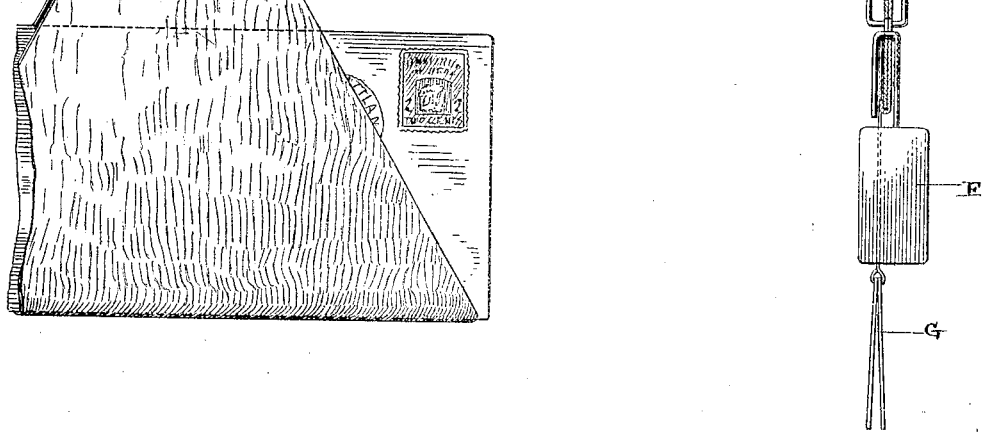

One of the uses to which my improved scale is particularly adapted is the weighing of letters and other mail-matter, and the form of my invention illustrated in the accompanying drawings, in which Figure 1 is a side elevation of the scale, and Fig. 2 is a cross-section thereof on the line 2 2 of Fig. 1, is that of a letter-scale.

It will of course be readily understood that the scales may be equally as well adapted to weigh other articles than letters and that the principle of my invention may be embodied in scales suitable for the weighing of heavy objects.

Referring now to the drawings, L represents the scale-beam, made of sheet metal, with its edges doubled over, as indicated at $l\,e$, and provided at its center with a bail K, by which it can be suspended freely, and with a balance-indicating point P at the center of its upper side. Two alined slots M and N are formed longitudinally in the beam L, each terminating near the center at equal distances from the bail and running to a point near the adjacent end of the beam. In one of these slots, such as N, the bail $f$ of a weight F is adapted to slide, while in the other, as M, the bail $g$ of the scale-pan or equivalent object-supporting means G is adapted to slide. The lower side of the slot M is furnished with a series of notches to engage the bail $g$, there being one at the outer end of said slot, (marked A in the drawings,) and one marked C at the inner end of the slot. Then half-way between A and the point of support there is a notch D, half-way between D and the said point one marked B, and half-way between B and the point of support one marked E. The other slot N is provided on its lower side with a series of equidistant notches to engage the bail $f$ of the weight F, and the beam below this slot is marked with a plurality of scales running in the device illustrated from one-half dram to four drams in the upper line marked A, from one-fourth ounce to two ounces in the second line marked B, and from one ounce to eight ounces in the lower line marked C.

Mounted to slide on the upper edge of the beam L on the opposite side of the bail K from the scale-pan G, is a rider H, conveniently made of a piece of wire bent into inverted-U shape and having the end in front of the beam turned in slightly, so that while the rider H can slide readily on the beam it cannot be removed except by sliding it off at the end of the beam. The upper side of the beam on which this rider slides is provided with a series of notches A' B' C' D' E', which are spaced similarly to the notches A to E in the slot M. The rider H is made of the same weight as the scale-pan G and must always be placed in the proper notch on the beam to correspond to the notch in which the bail $g$ is placed. Thus is G hung from notch A, as in the drawings, then H must be in notch A' if G is hung from D, then H must be in D', &c.

In the position shown in Fig. 1 and assuming that F weighs one-half ounce and that it just balances a letter placed in G then the weight of the letter can be read directly from the scale A—viz., one-half dram—the reason being, of course, that the leverage of the letter about the point of support is eight times that of the weight. If the weight F must be hung in the second notch to balance the letter, then it weighs one dram, &c. Now supposing the pan G to be hung in notch B, then rider H must be moved to notch B' in order to keep the beam level. If now the weight F in the first notch, as illustrated, suffices to balance the object being weighed, then the weight of that object can be read directly from scale B, and it is found to weigh one-fourth ounce. If the weight F in the position shown balances an object suspended from the notch C, (rider H being in notch C',) then it weighs one ounce, which is read off from the scale marked C.

In practice there are also lines D and E having scales corresponding to the positions D and E of the weight; but they are omitted from the drawings for the sake of clearness.

Having thus described my invention, what I claim, and desire to secure by Letters Patent, is—

A weighing-scale, comprising in combination a sheet-metal scale-beam having thickened edges, central supporting means therefor, there being a longitudinal slot in each half of the beam, a weight slidably carried in one of said slots, a scale-pan slidably carried in the other slot, both slots being graduated, the weight-slot with equivalent marks and the object-slot with marks set at distances in increasing multiple from the center, and a counterpoise slidably engaging the upper edge of the weight-arm, said edge being graduated to correspond with the graduations of the object-slot.

In witness whereof I have signed my name hereto, this 7th day of September, 1905, in the presence of two witnesses.

ELIAS E. BARAKAT.

Witnesses:
A. J. ARBEELY,
HOWARD A. COOMBS.